(12) United States Patent
Gersovitz

(10) Patent No.: US 11,230,411 B2
(45) Date of Patent: Jan. 25, 2022

(54) MULTI-COMPARTMENT CONTAINERS

(71) Applicant: Gerry Gersovitz, San Francisco, CA (US)

(72) Inventor: Gerry Gersovitz, San Francisco, CA (US)

( * ) Notice: Subject to any disclaimer, the term of this patent is extended or adjusted under 35 U.S.C. 154(b) by 140 days.

(21) Appl. No.: 14/693,765

(22) Filed: Apr. 22, 2015

(65) Prior Publication Data

US 2015/0225121 A1 Aug. 13, 2015

Related U.S. Application Data

(62) Division of application No. 13/093,468, filed on Apr. 25, 2011, now abandoned.

(60) Provisional application No. 61/345,974, filed on May 18, 2010.

(51) Int. Cl.
| | | |
|---|---|---|
| *B65D 25/04* | (2006.01) | |
| *B65D 35/22* | (2006.01) | |
| *B65D 1/04* | (2006.01) | |
| *B65D 5/48* | (2006.01) | |
| *B65D 30/22* | (2006.01) | |
| *B65D 43/14* | (2006.01) | |

(52) U.S. Cl.
CPC .............. *B65D 25/04* (2013.01); *B65D 1/04* (2013.01); *B65D 5/48* (2013.01); *B65D 31/12* (2013.01); *B65D 35/22* (2013.01); *B65D 43/14* (2013.01)

(58) Field of Classification Search
CPC ................................ B65D 31/12; B65D 25/04
USPC ........................................................ 383/38–40
See application file for complete search history.

(56) References Cited

U.S. PATENT DOCUMENTS

| | | | |
|---|---|---|---|
| 771,372 A | 10/1904 | Kruse | |
| 861,815 A | 7/1907 | Cullen | |
| 1,634,569 A | 7/1926 | Bray | |
| 1,798,071 A | 9/1928 | Deane | |
| 1,814,180 A | 7/1931 | Nicholls et al. | |
| 1,837,343 A | 12/1931 | Starke et al. | |
| 1,889,882 A * | 12/1932 | Woods | B65D 81/3266 |
| | | | 426/112 |
| 1,984,570 A | 12/1934 | Emmons et al. | |

(Continued)

FOREIGN PATENT DOCUMENTS

| | | |
|---|---|---|
| CA | 2737981 | 10/2014 |
| FR | 2701924 | 9/1994 |
| WO | 2018006085 | 1/2018 |

OTHER PUBLICATIONS

Final Office Action dated Feb. 12, 2013 in U.S. Appl. No. 12/622,853, 8 pages.

(Continued)

*Primary Examiner* — Shawn M Braden
(74) *Attorney, Agent, or Firm* — Kilpatrick Townsend & Stockton LLP

(57) ABSTRACT

Multi-compartment containers including multi-compartment cans, canisters, boxes and bags and methods for using the same are disclosed. Multi-compartment containers that provide access to one portion of the contents until depleted while maintaining a seal and thus protecting the freshness or potency, of the contents on another portion allows products to be packaged and sold in a way that maintains freshness and potency longer. Each compartment of the multi-compartment containers can be configured to have either a single-use or re-sealable seal.

16 Claims, 10 Drawing Sheets

(56) References Cited

U.S. PATENT DOCUMENTS

| | | | |
|---|---|---|---|
| 2,073,636 | A | 3/1937 | Holoubek |
| 2,296,951 | A * | 9/1942 | Rosen ................... B65D 65/22 229/87.09 |
| 2,371,173 | A | 3/1945 | Hothersall |
| 2,553,559 | A | 5/1951 | Eckman |
| 2,605,013 | A | 7/1952 | Rubenstein |
| 2,611,499 | A * | 9/1952 | Mayer ..................... B65D 1/10 215/6 |
| 2,679,281 | A | 5/1954 | Paulucci et al. |
| 2,833,436 | A | 5/1958 | Ruderian |
| 2,963,194 | A | 12/1960 | Brennan et al. |
| 3,106,313 | A | 10/1963 | Kurhan |
| 3,113,668 | A | 12/1963 | Edward et al. |
| 3,144,152 | A | 8/1964 | Kopp |
| 3,199,756 | A | 8/1965 | Davy |
| 3,272,671 | A | 9/1966 | Gaylord et al. |
| 3,288,342 | A | 11/1966 | Tinker |
| 3,317,087 | A | 5/1967 | Landis et al. |
| 3,465,905 | A | 9/1969 | Schottanes |
| 3,485,416 | A | 12/1969 | Fohrman |
| 3,580,481 | A | 5/1971 | Koboldt |
| 4,078,686 | A | 3/1978 | Karesh |
| D270,135 | S | 8/1983 | Gates |
| 4,404,941 | A | 9/1983 | Masaki |
| 4,444,324 | A | 4/1984 | Grenell |
| D280,599 | S | 9/1985 | Green |
| 4,598,832 | A | 7/1986 | Alonso |
| 4,664,274 | A | 5/1987 | Franz |
| 4,890,759 | A | 1/1990 | Scanga et al. |
| 4,925,055 | A | 5/1990 | Robbins et al. |
| 4,972,657 | A | 11/1990 | McKee |
| 4,981,214 | A | 1/1991 | Rojas et al. |
| 5,076,430 | A | 12/1991 | Philpot et al. |
| 5,258,191 | A | 11/1993 | Hayes |
| 5,279,841 | A | 1/1994 | Yu |
| 5,353,985 | A | 10/1994 | Nageli et al. |
| 5,385,294 | A | 1/1995 | Andresson et al. |
| 5,388,699 | A | 2/1995 | Ratajczak et al. |
| 5,499,738 | A | 3/1996 | Burleigh |
| 5,630,523 | A | 5/1997 | Wright |
| 5,664,671 | A | 9/1997 | Nedblake et al. |
| 5,669,523 | A | 9/1997 | Mueller et al. |
| 5,692,626 | A | 12/1997 | Wehrle et al. |
| 5,722,540 | A | 3/1998 | Laird et al. |
| 5,731,020 | A | 3/1998 | Russo |
| 5,803,294 | A | 9/1998 | Bello |
| 5,954,213 | A | 9/1999 | Gerhart et al. |
| 6,105,812 | A | 8/2000 | Riordan |
| 6,138,899 | A | 10/2000 | Grabher |
| D434,312 | S * | 11/2000 | Pegler ............................ D9/714 |
| 6,145,685 | A | 11/2000 | Dick et al. |
| 6,179,146 | B1 | 1/2001 | Betras et al. |
| 6,196,412 | B1 | 3/2001 | Cattell |
| 6,415,940 | B1 | 7/2002 | Brabson |
| 6,450,351 | B1 | 9/2002 | Thompson |
| 6,499,614 | B1 | 12/2002 | Thompson |
| 6,708,735 | B1 | 3/2004 | Kenihan |
| 6,723,360 | B1 | 4/2004 | Dunaway et al. |
| 6,955,028 | B1 | 10/2005 | Dunaway et al. |
| 6,971,521 | B2 | 12/2005 | Pinyot et al. |
| 7,516,596 | B2 | 4/2009 | Henderson et al. |
| 7,571,829 | B2 | 8/2009 | Gersovitz |
| 8,449,186 | B2 | 5/2013 | Bray |
| 8,915,395 | B2 | 12/2014 | Gersovitz |
| 9,611,073 | B2 | 4/2017 | Gersovitz |
| 10,407,214 | B2 | 9/2019 | Gersovitz |
| 2001/0030134 | A1 | 10/2001 | Goglio |
| 2001/0040164 | A1 | 11/2001 | Cleator |
| 2002/0088730 | A1 | 7/2002 | Galomb |
| 2002/0130126 | A1 | 9/2002 | Rosenberg |
| 2004/0121047 | A1 | 6/2004 | Cohen |
| 2004/0159625 | A1 | 8/2004 | Kwan et al. |
| 2004/0231111 | A1 * | 11/2004 | Martinez ............ B65D 33/1625 24/30.5 S |
| 2005/0173501 | A1 | 8/2005 | Jones |
| 2006/0219719 | A1 | 10/2006 | Dixon |
| 2006/0257534 | A1 | 11/2006 | Maddock |
| 2007/0012710 | A1 | 1/2007 | Vovan |
| 2007/0267416 | A1 | 11/2007 | Eichenbaum |
| 2009/0236346 | A1 | 9/2009 | Hofeldt et al. |
| 2009/0241477 | A1 | 10/2009 | Gersovtiz et al. |
| 2010/0065557 | A1 | 3/2010 | Gersovitz |
| 2010/0142861 | A1 | 6/2010 | Sam |
| 2010/0142862 | A1 | 6/2010 | Sam |
| 2010/0159096 | A1 * | 6/2010 | Sam ................... B65D 33/2591 426/394 |
| 2011/0253725 | A1 | 10/2011 | Killiam |
| 2011/0284550 | A1 | 11/2011 | Gersovitz |
| 2017/0297769 | A1 | 10/2017 | Gersovitz |

OTHER PUBLICATIONS

Office Action dated Sep. 11, 2012 in U.S. Appl. No. 12/622,853, 6 pages.
U.S. Appl. No. 12/415,910, "Non-Final Office Action", dated Sep. 23, 2010, 9 pages.
U.S. Appl. No. 13/093,468, "Final Office Action", dated Sep. 23, 2014, 10 pages.
U.S. Appl. No. 13/093,468, "Non-Final Office Action", dated May 8, 2014, 11 pages.
U.S. Appl. No. 13/093,468, "Non-Final Office Action", dated May 1, 2015, 9 pages.
U.S. Appl. No. 13/093,468, "Office Action", dated Feb. 12, 2013, 14 Pages.
U.S. Appl. No. 13/093,468, "Office Action", dated Jul. 23, 2012, 9 pages.
CA2,737,981, "Office Action", dated Jul. 2, 2014, 1 page.
CA2,737,981, "Office Action", dated Feb. 3, 2014, 2 pages.
CA2,737,981, "Office Action", dated Sep. 6, 2012, 2 pages.
CA2,737,981, "Office Action", dated May 31, 2013, 4 pages.
International Preliminary Report on Patentability dated Jan. 10, 2019 for PCT Application No. PCT/US2017/040583, 7 pages.
Non-Final Office Action dated Nov. 14, 2018 for U.S. Appl. No. 15/640,793, 9 pages.
Notice of Allowance dated Apr. 25, 2019 for U.S. Appl. No. 15/640,793, 5 pages.
International Search Report and Written Opinion dated Nov. 30, 2017, for International Applicaiion No. PCT/US2017/040583, 6 pages.
Non-Final Office Action for U.S. Appl. No. 16/457,434, dated Jun. 28, 2021, 10 pages.

* cited by examiner

MULTI-COMPARTMENT CONTAINERS

CROSS-REFERENCES TO RELATED APPLICATIONS

This application is a divisional of U.S. application Ser. No. 13/093,468, filed Apr. 25, 2011, entitled MULTI-COMPARTMENT CONTAINERS, which claims priority and benefit from U.S. Provisional Application No. 61/345,974, filed May 18, 2010. This application is also related to U.S. application Ser. No. 12/622,853, filed Nov. 20, 2009 (now U.S. Pat. No. 8,915,395), which is a continuation-in-part of U.S. application Ser. No. 12/415,910, filed Mar. 31, 2009 (now abandoned), which is a divisional application of U.S. application Ser. No. 10/948,837, filed Sep. 22, 2004 (now U.S. Pat. No. 7,571,829), which claims priority to U.S. Provisional Application No. 60/505,410, filed on Sep. 23, 2003, the disclosures of which are all incorporated herein by reference in their entirety for all purposes.

BACKGROUND

Embodiments of the present invention relate to packaging for consumer and commercial products that can lose potency or freshness when the package is opened and the contents are exposed to atmospheric conditions, such as oxygen and moisture in air. While such problems are present in traditional sizes and portions, they are a particularly pronounced in products that are typically purchased in "bulk" or "economy" sizes or take some amount of time to use or consume once the package has been opened. The amount of product or size of the portion that is considered "bulk" or "economy" sizes can depend on the nature of the product. For example, ground coffee can quickly lose its aromatic oils when exposed to air, while other dry goods, such as dry rice and dried beans, are much more stable when exposed to air. Other products, such as baking powder, can begin losing potency immediately upon exposure to air. Accordingly, the amount of the product that might be considered "bulk" or "economy" size can vary with the type of the product and its ability to maintain freshness upon exposure to air.

One particular problem with "bulk" or "economy" size single compartment packaging is that the entirety of the contents is exposed to the air once the package is opened for the first time and each time the package is accessed to remove more product. As such, the possible savings realized on a per serving or per use basis can be and are often lost due to spoilage or staleness of at least some of the product if not used in a timely manner. This problem is only exacerbated by the mandatory or voluntary removal of preservatives from many products and food stuffs FIG. 1 shows three examples of conventional packages or containers that are used for consumer and commercial products. Typical cans or canisters, represented by can 105, are available in various sizes and proportions and made of various materials, such as metal, plastic, cardboard, paperboard, foil, Mylar™, or a composite of any of the foregoing. Conventional boxes or cartons, such as box 110, similarly, are available in various sizes and proportions and made of various materials, such as metal, plastic, cardboard, paperboard or a composite or combination of any of the foregoing. Conventional bags, such as bag 115, also are available in various sizes and proportions and made of various materials, such as paper, plastic, Mylar™, foil or a combination of any of the foregoing. Plastics can include traditional variations of polyethylene. Each of can 105, box 110 and bag 115 are single compartment containers. As such each exhibit a similar problem with single compartment containers in that once they are opened, the entire contents of the container are exposed to air and moisture.

As known, exposure to air and moisture can cause many products, such as food stuffs, to lose freshness or go stale. To avoid continued exposure to air and moisture, some configurations of can 105, box 110 and bag 115 include re-sealable or reusable lids and closures. For example, can 105 might include a reusable plastics lid, box 110 might include a re-sealable top having some type of reusable adhesive, while bag 115 might be equipped with a re-sealable or reusable closure like a zipper or a clip. However, such re-sealable or reusable closures still allow the entirety of the remaining contents to be exposed to new air and moisture each time the package is opened to access the product.

As individuals, families and businesses increasingly purchase staple and other products in "bulk" or "economy" sizes or portions, there is a need to preserve the freshness and potency of products after the package is opened and until the product is used, consumed or depleted. Embodiments of the present invention address these and other issues.

BRIEF SUMMARY

One embodiment is directed toward a multi-compartment container having a first compartment, and a second compartment, wherein the first compartment and the second compartment can be separately filled with a product and separately sealed.

Another embodiment is directed toward a multi-compartment container wherein the first and second compartments are defined by a box or a carton having an internal divider.

Yet another embodiment is directed toward a multi-compartment container wherein the first and second compartment are defined by a bag having a first sealed end, a second sealed end and a divider seal disposed between the first sealed end and the second sealed end and separating the first and second compartments.

Another embodiment is directed toward a method of using a multi-compartment container. The method includes obtaining a multi-compartment container having a product packaged in two or more compartments and opening a first compartment to access the contents. The contents of the first compartment can then be used until depleted. When the contents of the first compartment are depleted, a second compartment is opened to access the contents of the second compartment.

DETAILED DESCRIPTION

Embodiments of the present invention are directed toward multi-compartment containers and packages that can be used to help better preserve the freshness and potency of consumer and commercial products. In particular, the embodiments of the present invention are directed to multi-compartment bags, pouches, boxes, cartons, cans and canisters that allow users to access and use a portion of the product contained therein while keeping one or more portions of the product sealed in the same state as it was originally packaged. In particular, the multi-compartment storage devices or containers include at least two compartments in which sundry consumer and commercial products can be packaged in multiple portions, thus protecting some portion of the product from environmental conditions, such as air and moisture, while the opened portion is used.

According to various embodiments, multi-compartments can be filled by a manufacturer, packager or reseller with at least one product may be susceptible to loss of freshness or potency when exposed to environmental conditions outside of the multi-compartment container. The size of the compartments in the multi-compartment container can be equal or different. Similarly, the size of each compartment of the multi-compartment container can be based on the nature of the packaged contents. For example, products such as cereal, which have a moderate resistance to becoming stale, might be packaged in a compartment of one multi-compartment container that is larger than the compartment in another multi-compartment container used to package baking soda, which is highly susceptible to loss of potency. Typically, the more susceptible a product is to loss of freshness or potency, the more it become desirable to package it in a smaller compartment of multi-compartment container, so as to protect the remaining product in other compartment of the multi-compartment container.

Figure 1:
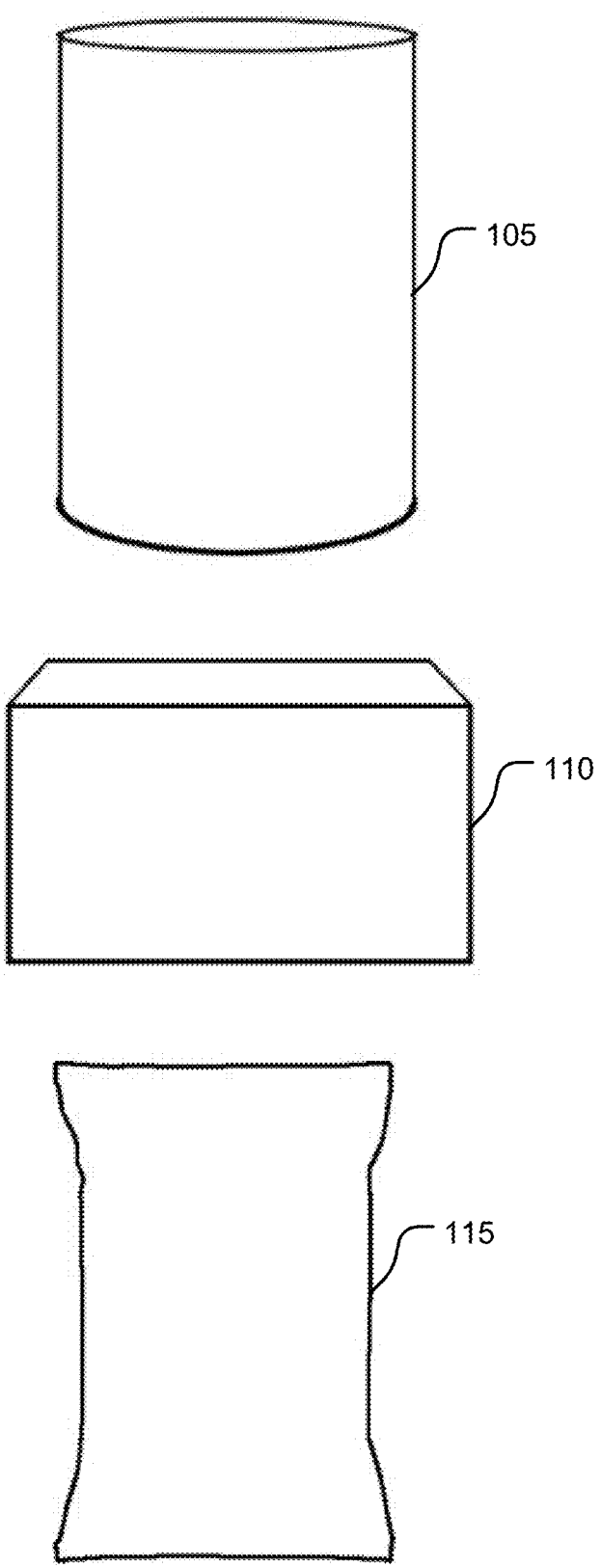
FIG. 1 shows three type of conventional packages that can be improved by various embodiments of the present invention.
Figure 2:
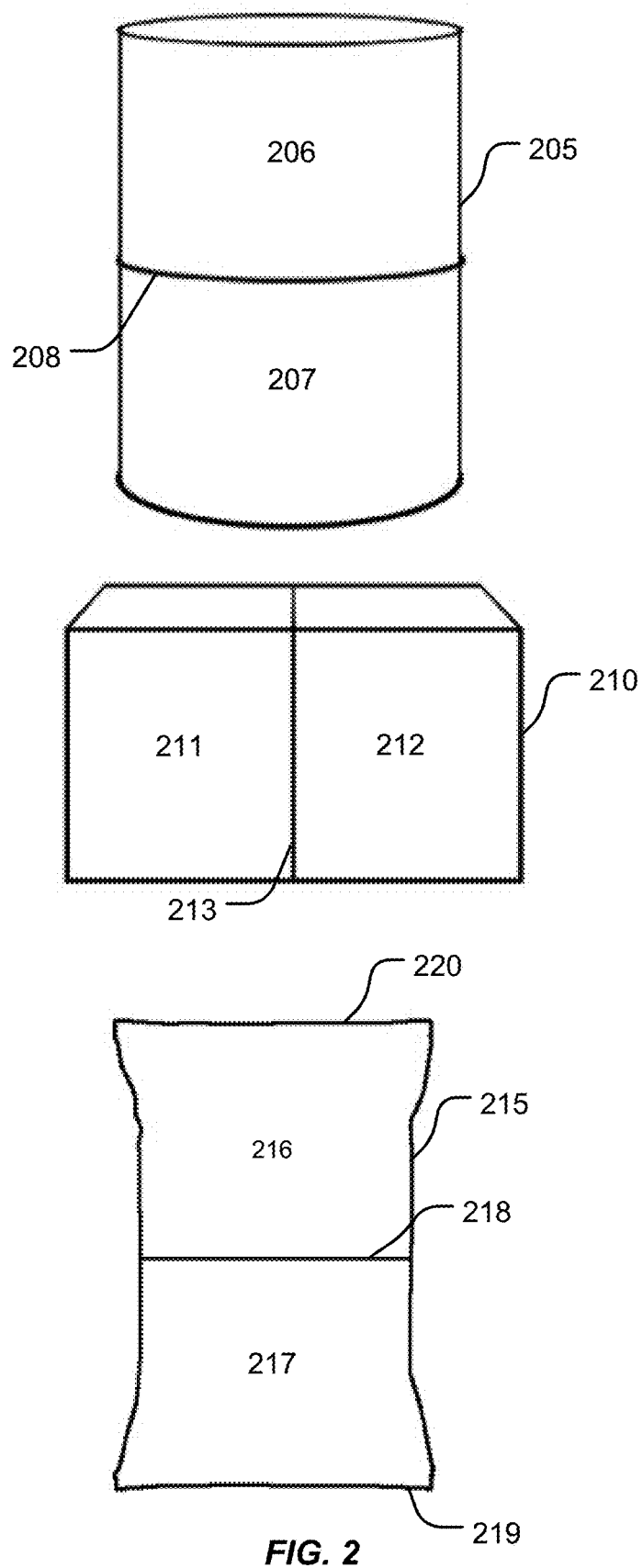
FIG. 2 shows three examples of multi-compartment versions of the packages shown in FIG. 1, as improved by various embodiments of the present invention.

FIG. 2 shows improvements to the can or canister 105, box 110 and bag or sack 115 as shown in FIG. 1. The illustrations of multi-compartment can 205, multi-compartment box 210 and multi-compartment bag 215 show the improvements according to various embodiments of the present invention. Each of the of the varieties of multi-compartment container, shown in FIG. 2 can be made of various materials and include various seals and lids based on the type of product that they will be used to package. Furthermore, even though the examples shown FIG. 2 each have two compartments, various embodiments of the present invention can include more than two compartments.

Can 205 can include two compartments 206 and 207. Compartment 206 and 207, as well as other compartments in other embodiments, can be separately manufactured and then attached to one another. In such embodiments, each compartment can be a full or partial container with or without a full set of side/walls, top and bottom. Such embodiments are described in more detail in related U.S. Pat. No. 7,571,829, and U.S. patent application Ser. No. 12/622,853. Alternatively, compartments 206 and 207 of can 205 can be made of a single cylindrical or other shape outer body with an interior divider wall 208.

The divider wall 208 can be oriented in any plane within can 205. In yet other embodiments, can 205 can include more than two compartments. In some embodiments, the divider wall 208 can affixed to the interior wall of a cylinder, while in other embodiments the divider wall 208 can be included in the exterior structure of the can 205. In such embodiments, the divider wall 208 can be used to connect two cylinders of similar or dissimilar materials having either the same or different volumes.

Similarly, the divider wall 208 can have any shape to accommodate various products or the divide up the volume of the multi-compartment container into structurally or visually interesting or aesthetic volumes. For example, divider wall 208 need not be a flat disc. In fact, for the purposes of reducing the material needed to manufacture the divider wall 208, divider wall can include stamped or molded ribs to increase the structural integrity. Also, it is possible that the divider wall can be in the shape of a cone, a parabolic rotation, or bubble shape with at least one plane, edge or rim that can connect to the wall of can 205. Such configurations can provide novel ways to divide the interior volumes of the multi-compartment container. Such embodiments can be particularly desirable for multi-compartment containers with transparent or translucent side walls, such that the divider and the separate volumes within the multi-compartment container can be seen or observed from the exterior of the multi-compartment container.

According to various embodiments of the present invention, box 210 can include at least two compartments, such as 211 and 212. Box 210 can also include more than two compartments. Similar to box 110, box 210 can be made of various materials. For example, the walls, sides, top and bottom of box 210 can include cardboard, paperboard, metal, wood, plastic, foil, Mylar™ or some composite or combination of the foregoing materials. Any material suitable for making walls, sides, top and bottom rigid enough to contain the intended contents of box 210 can be used.

Compartment 211 and 212 can be constructed of the same or different materials. In some embodiments, box 210 having compartments 211 and 212, can be constructed of a single piece of cardboard, paper or paperboard, or plastic using known box folding pattern and construction techniques. In other embodiments, box 210 can be constructed by joining two separate boxes having compartments 211 and 212 respectively. In other embodiments, box 210 can include a divider 213 affixed to the interior of box 210. The dividing wall 213 can define compartment 211 and 212 with identical or different volumes. According to other embodiments, box 210 can have more than two compartments. The divider wall 213 can be oriented in any plane within box 210, including planes parallel or perpendicular to the long or short axes of the box 210. Divider wall 213, can also have any shape suitable for separating the volumes of compartment 211 and 212.

In various embodiments, compartments 211 and 212 can be used to package the same or different products, materials or food stuffs. Each compartment 211 and 212 can be opened, unsealed or accessed individually. In such embodiments, while the contents of one compartment are in the process of being used or consumed, the contents of the other compartment remain sealed to protect freshness or potency. Such configurations have the advantage of providing larger quantities of the product to be packaged and sold with less potential of the contents losing freshness or potency due to exposure to air. From a consumer point of view, economical quantities of products can be purchased with a lower chance that the purchased product be lost to waste. These advantages provide potential for greater profitability on the side of the manufacturer or packager by creating a more desirable packaged product and thus higher demand, at the same time as providing potential cost savings of bulk quantity purchases for the user or consumer. As used herein, the terms consumer can include any type of entity, including, but not limited to, individuals, families, restaurant, food preparation professional, chefs, workers, hospitals, hotels, etc.

Also shown in FIG. 2 is bag 215. As shown, bag 215 can have two compartments 216 and 217. In some embodiments, compartments 216 and 217 can be formed by crimping, sewing or heat welding the non-rigid or semi-rigid walls of bag 215 at seam 218. The non-rigid or semi-rigid walls of bag 215 can include paper, plastic film, foil, Mylar™, cellulose or some combination or composite thereof. Bag 215 can have its top and bottom end seams 219 and 220 sealed in the same manner. In other embodiments, seam 218 can be oriented in the longitudinal direction running from end 219 to 220. In yet other embodiments, ends 219 and 220 can include re-closable seams or seals, such as zipper-type or reusable adhesive-type closures.

Figure 3:
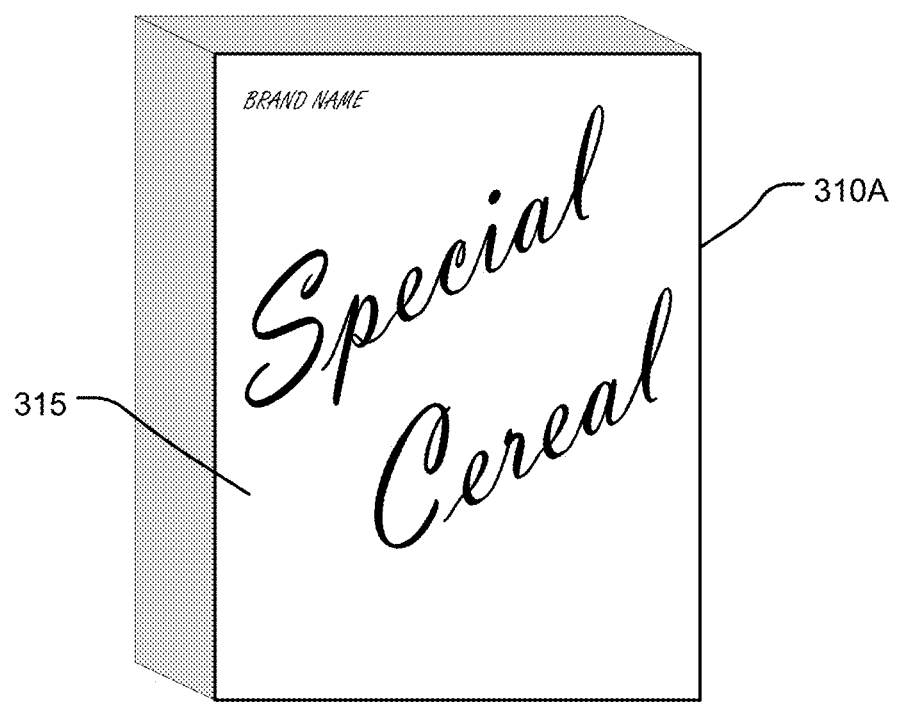
FIG. 3 shows a multi-compartment box according to one embodiment of the present invention.
Figure 3:
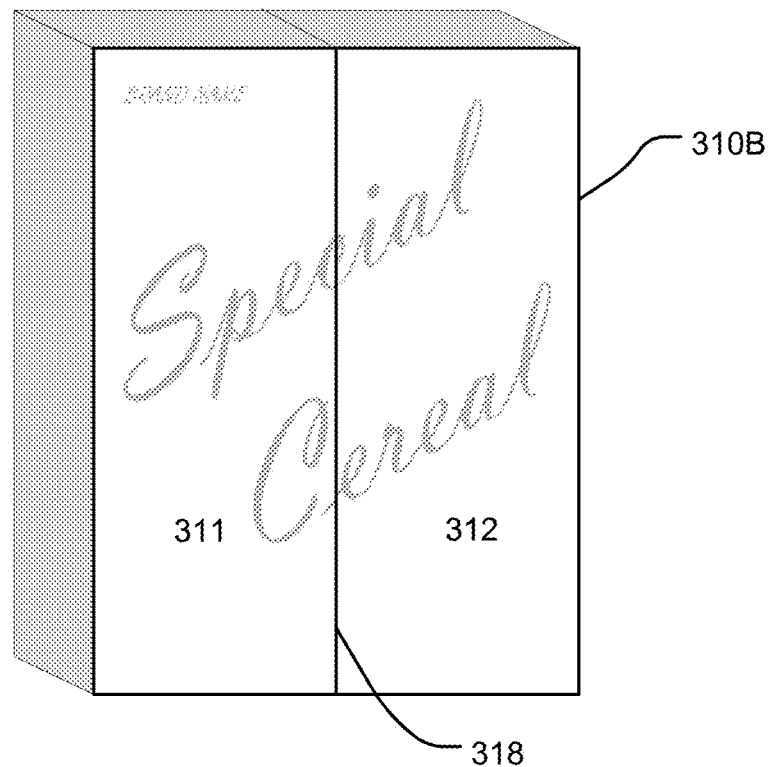

FIG. 3 shows an example of a two compartments cereal box 310A according to one embodiment of the present invention. Cereal box 310A can include compartments 311 and 312. The construction of cereal box 310A can include the same materials as described above in reference to box 210. Compartments 311 and 312 can be constructed of or include the same or different materials.

In various embodiments, a consumer can access and use the contents of compartment 311 without exposing the contents of compartment 312. Once the contents of compartment 311 are depleted, a user can open or unseal compartment 312 to access the contents of that compartment. Each of compartment 311 and 312 can include desiccants. Compartments 311 and 312 can also include liners, or re-sealable or reusable lids or closures elements for creating an airtight or hermetic enclosure, separate from the airtight or hermetic enclosure of the other compartment of the multi-compartment container.

Although cereal box 310A is shown and described as a cereal box, this example is only illustrative and should not be construed as limiting a box such as 310A to being only used for packaging cereal. Cereal box 310A, as well as any other container according to other embodiments, can be used to package numerous types of dry food, commercial or industrial products that are sensitive to air, such as grains, chips, marshmallows, pretzels, nuts, dried fruit, oats, weight control supplements, protein powders, milk additives, such as chocolate milk powder, plaster of Paris, baby food, cookies, crackers, baking mixes, pancake mixes, cake mixes, brownie mixes, drink mixes, car wax, greases, sealants, epoxies, glues, cigars, cigarettes etc.

As shown, the cereal box 310A can have an exterior surface 315. Exterior surface 315 can include a material identical to that of cereal box 310A or comprise a wrapper made of a different material. For example, the body of cereal box 310A can be made of cardboard or a composite of cardboard and plastic, while the exterior surface 315 can be or wrap made of plastic film or a separate piece of paper wrapped around or otherwise affixed to cereal box 310A. In some embodiments, it is desirable for the exterior 315 to have printed information to identify the contents and the proper use of the contents of cereal box 310A and its constituent compartments 311 and 312.

Box 310B shows the interior construction of cereal box 310A. As shown, box 310B includes a divider 318 separating compartments 311 and 312. Divider 318 can be oriented in any direction, including, but not limited to, vertical or horizontal with respect to the orientation of packaging.

Divider 318 can be integral to the construction of the box 310B or can be a separate piece and even be made of a different material than the exterior 315, walls, sides, top and bottom of box 310B. In some embodiments, it is beneficial for the material of box 310B to include a composite material to further insure freshness and potency of the contents of compartments 311 and 312. To that end, it is often desirable to use a cardboard or paperboard laminated or other combined with plastic or Mylar™ type product in the construction of box 310B.

Figure 4:
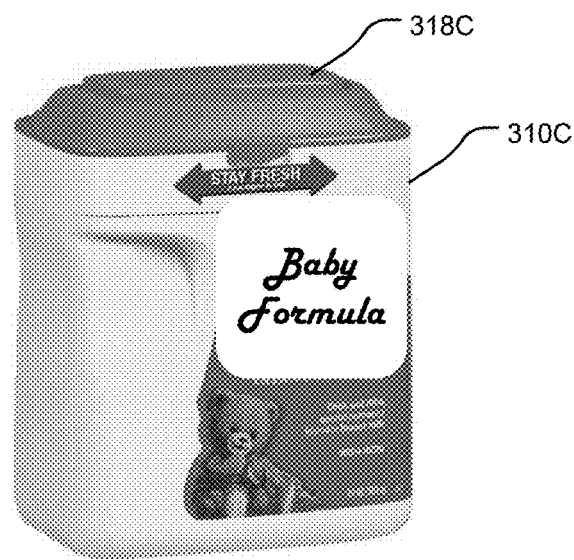
FIG. 4 shows a multi-compartment container according to one embodiment of the present invention.
Figure 4:
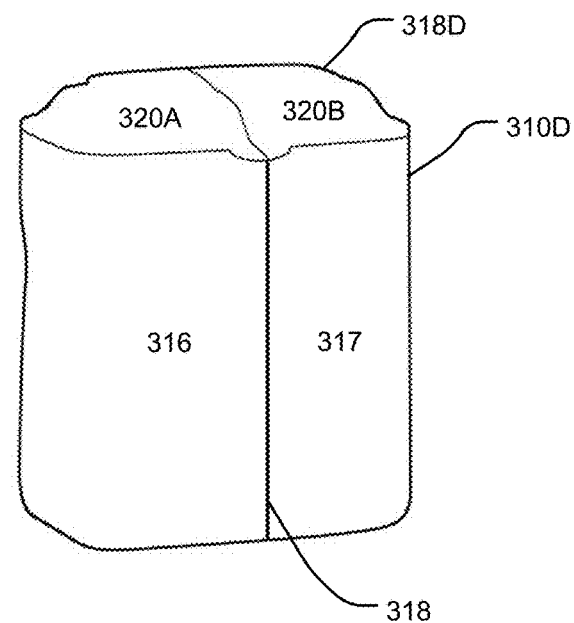

Various other boxes and containers according to various embodiments of the present invention can be made of waterproof or moisture resistant materials such as plastic. Such embodiments are particularly advantageous when the contents of multiple compartments of the containers described herein are wet or moist. For example, such multi-compartment containers are useful for dispensing one portion of pre-moistened wipes while keeping another portion fresh for future use. Such wipes can include fabric or paper based towels pre-moistened or laced with solutions, detergents, and medications for personal care and hygiene or household or industrial use. Some embodiments include wipes, moistened disinfectants, cleaners, polishes, waxes, soaps, or medications and topical solutions such as make-up removers, skin treatments, moisturizers and sanitary solutions. FIG. 4 shows one example of a plastic box 310C according to one embodiment of the present invention that can be suitable for packaging dry or wet products. As with the container shown in FIG. 3, the divider wall 318 in FIG. 4 can also be disposed in any orientation with respect to the other surfaces of the container.

By using an appropriate plastic or other polymer, box 310C can be used to package or contain various types of liquids and wet products that require special handling or an airtight seal to maintain usefulness. The airtight seal afforded by using a plastic material for the body and lid 318C for box 310C can be useful in other applications as well. Plastic materials are useful for making reusable and re-sealable or reusable lids or closure elements such as lid 318C. Such types of re-sealable lids or closure elements are useful for products that are used frequently or when the container is required to withstand being transported after the container is opened. For example, box 310C can be used to package products such as wet or dry baby formula that must survive being carried in a carry bag with other supplies on a regular basis while protecting the baby formula from contamination and preventing the baby formula from spilling. Such containers are also useful for frequently used and moisture sensitive products such as powdered drink, iced-tea and chocolate milk mixes.

Box 310D shows the internal construction of box 310C. As shown, box 310D can include compartments 316 and 317 that can be individually sealed with re-sealable lids 320A and 320B that make up lid 318D. In some embodiments, lids 320A and 320B can be opened and closed as a single unit or operated independently as individual lids. Embodiments in which lid 318D operates as a single piece, compartments 316 and 317 can be sealed by an additional and separately openable seals, such as one time use foil or plastic seals applied at the packaging facility. In other embodiments, lids 320A and 320B can be operated independently of one another and perform as the factory seal and the re-sealable lid for compartments 316 and 317 respectively.

In some embodiments, box 310C and 310D can be molded as a single piece or can include multiple separately molded pieces that can be adhered, welded or otherwise affixed to another to form multi-compartment boxes. In some embodiments, it may be desirable for box 310C and box 310D to include pour spouts or anti-drip spouts to prevent spills or protect the outside of the box from being contaminated or stained by the contents contained in compartments 316 and 317. Although only two compartments are described in reference to the boxes 310C and 310D are shown in FIG. 4, various other embodiments contemplate more than two compartments.

Figure 5:
FIG. 5 shows a multi-compartment bag according to one embodiment of the present invention.
Figure 5:
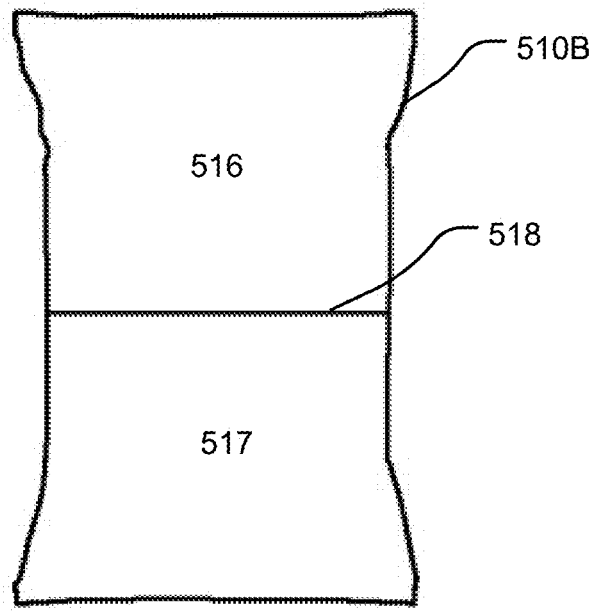

FIG. 5 shows a multi-compartment bag according to another embodiment of the present invention. Bag 510A can have sides or walls made of any suitable non-rigid or semi-rigid material for containing and maintaining freshness of the intended contents. For example, the material of the non-rigid or semi-rigid walls of bag 510A can be plastic, plastic film, Mylar, paper or biodegradable or compostable cellulose or combination thereof. The material of the walls or sides of bag 510A can include any type of flexible, non-rigid or semi-rigid material. Bag 510B shows the internal construction of bag 510A.

As shown, bag 510B can include compartments 516 and 517 divided by dividing seam 519. As in other embodiments of the present invention, compartments 516 and 517 can be used to contain or package the same or different materials from one another. Seam 518 can be formed in bag 510B to define separate compartments 516 and 517. As such, bag 510B can include compartments 516 and 517 as two separately openable pouches each having a separate portion of product therein. Seam 518 can be formed by crimping, sewing, welding or adhering the walls of bag 510B to one another to form two compartments 516 and 517. In some embodiments, seam 518 can include perforations that can be used to detach one of the compartments from the other compartments once the contents of the compartment are depleted. In such embodiments, the multi-compartment bag 510B can be reduced in size as the contents are used to save storage space and for the convenience of the user.

User or consumers can open and access the contents of each compartment or pouch individually, while maintaining the freshness of the contents of the other pouch until the contents of the first pouch are depleted.

Figure 9A:
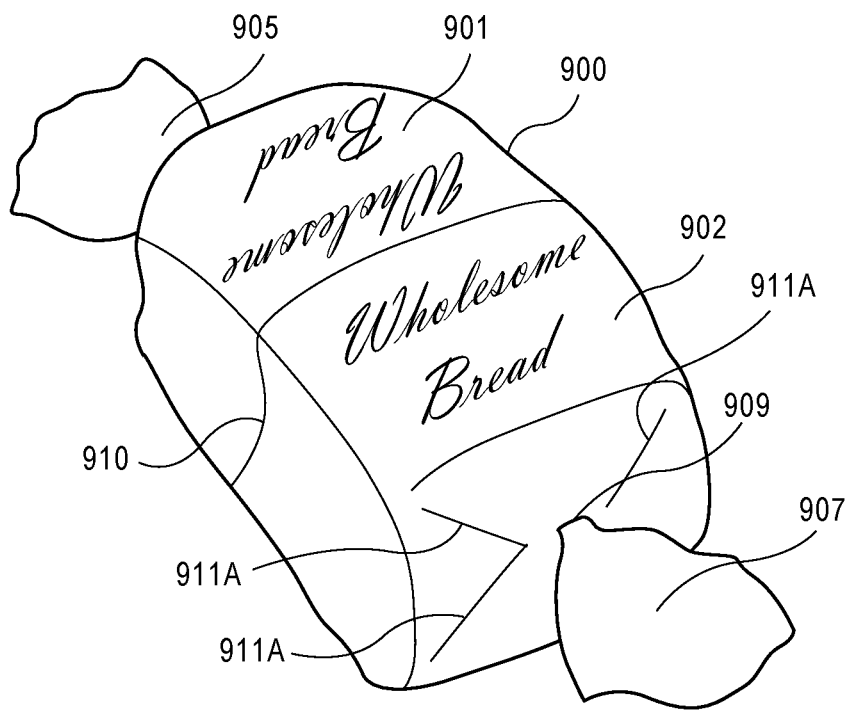
FIGS. 9A-C show a multi-compartment bag according to one embodiment of the present invention.
Figure 9B:
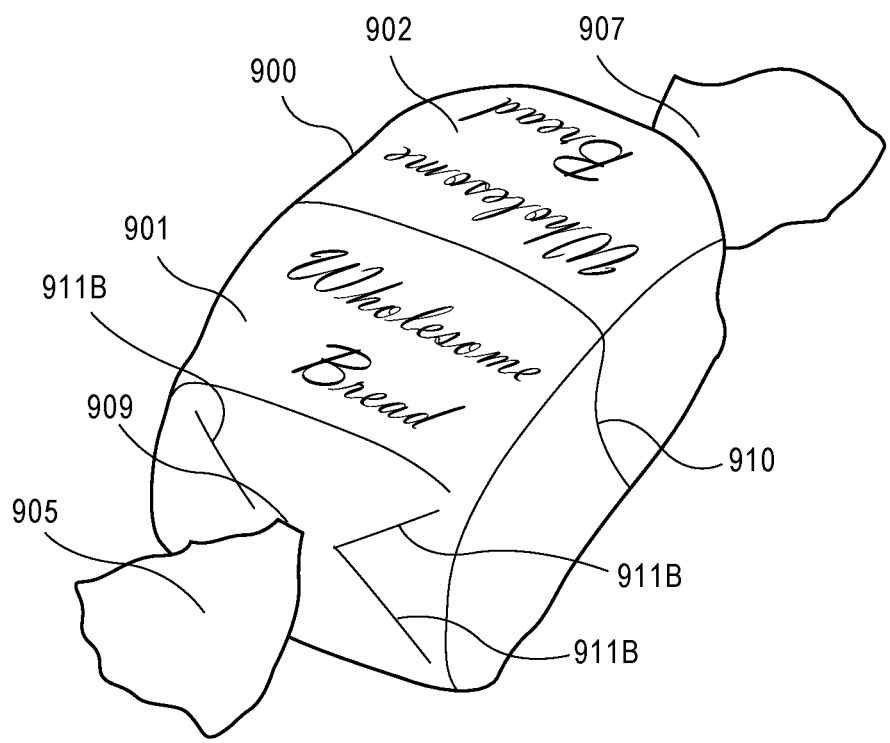
Figure 9C:
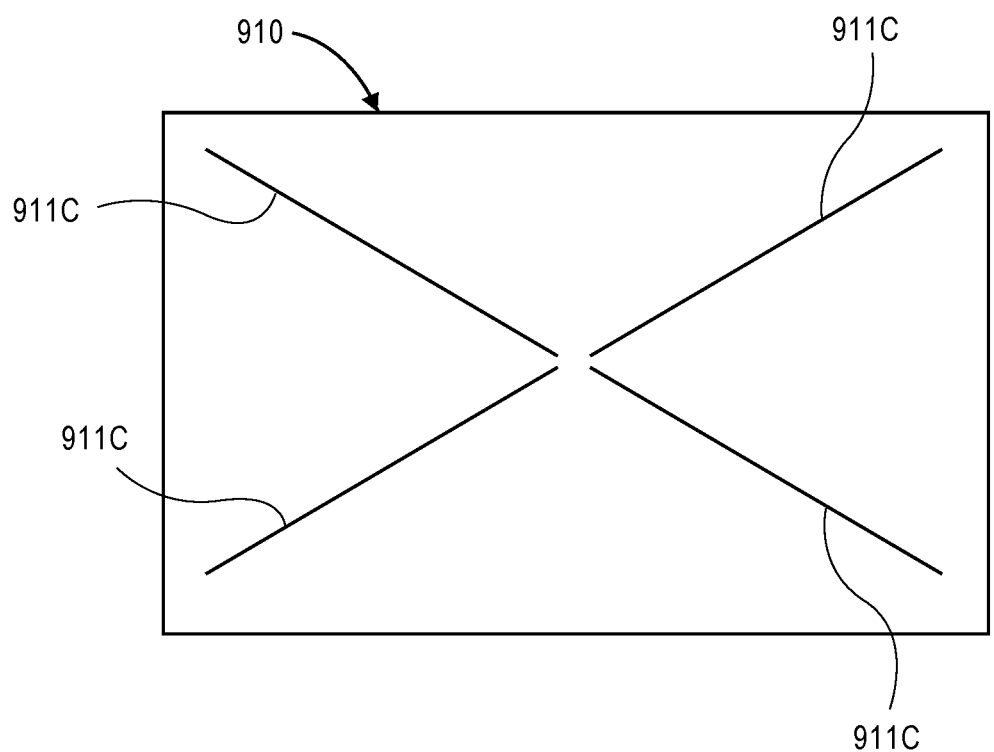

Bags 510A and 510B can be used to package various types of materials, products and foodstuffs. For example, bag 510A can be used to package foods such as potato chips, pretzels, nuts, hot dogs, salad and other foods that are susceptible to spoilage or staleness upon exposure to oxygen and moisture. In related embodiments, each compartment of a multi-compartment bag can contain a full or partial loaf of sliced or unsliced bread. In embodiments directed toward packaging bread shown in FIGS. 9A-C, the divider 910 that separates compartments 901 and 902 of multi-compartment container 900 can be a sheet of similar or dissimilar material as the walls of the multi-compartment bag to provide a less constricting volume within each compartment. Such dividers can be constructed according to various methods of attaching and pleating the bag material. The pleats 911C of divider 910 can be similar to pleats 911A and 911B. The openable portions 905 and 907 of the multi-compartment s can include various closure systems to help preserve the freshness of the contents. Such closures can include twist ties 909, clips, and zip type seals.

Alternatively, bag 510A can be used to package refill portions of regularly used household goods such as dish, laundry and hand soap, as well as condiments such as ketchup mustard or mayonnaise. In such embodiments, the use of a bag 510A can help reduce the amount of packaging required for distributing regularly used household goods while also providing users and consumers with an economical quantity discount.

Figure 6:
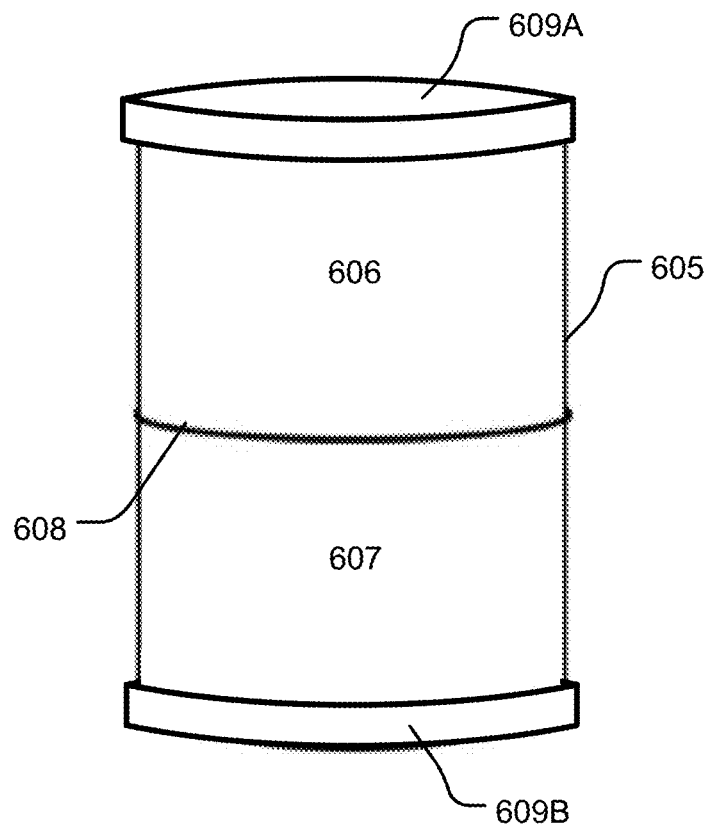
FIG. 6 shows a multi-compartment can/canister according to one embodiment of the present invention.

FIG. 6 shows another embodiment that can include a multi-compartment container 605 for packaging ice cream. In such embodiments, multi-compartment container 605 can include compartments 606 and 607 that can contain a portion of ice cream. Each compartment 606 and 607 separate from one another by divider 608, as described above in references to FIG. 2. Each compartment 606 and 607 can also be sealed with a plastic film, foil or Mylar™ single use cover and also include a reusable lid 609A or 609B respectively. The single use seals allows a consumer to open only one portion of ice cream contained in multi-compartment container 605, thus protecting the unopened portion from freezer burn or the formation of ice crystals that can develop despite the use of the reusable lids 609A and 609B, and thus prevent the degradation of the flavor and texture of ice cream.

Figure 7:
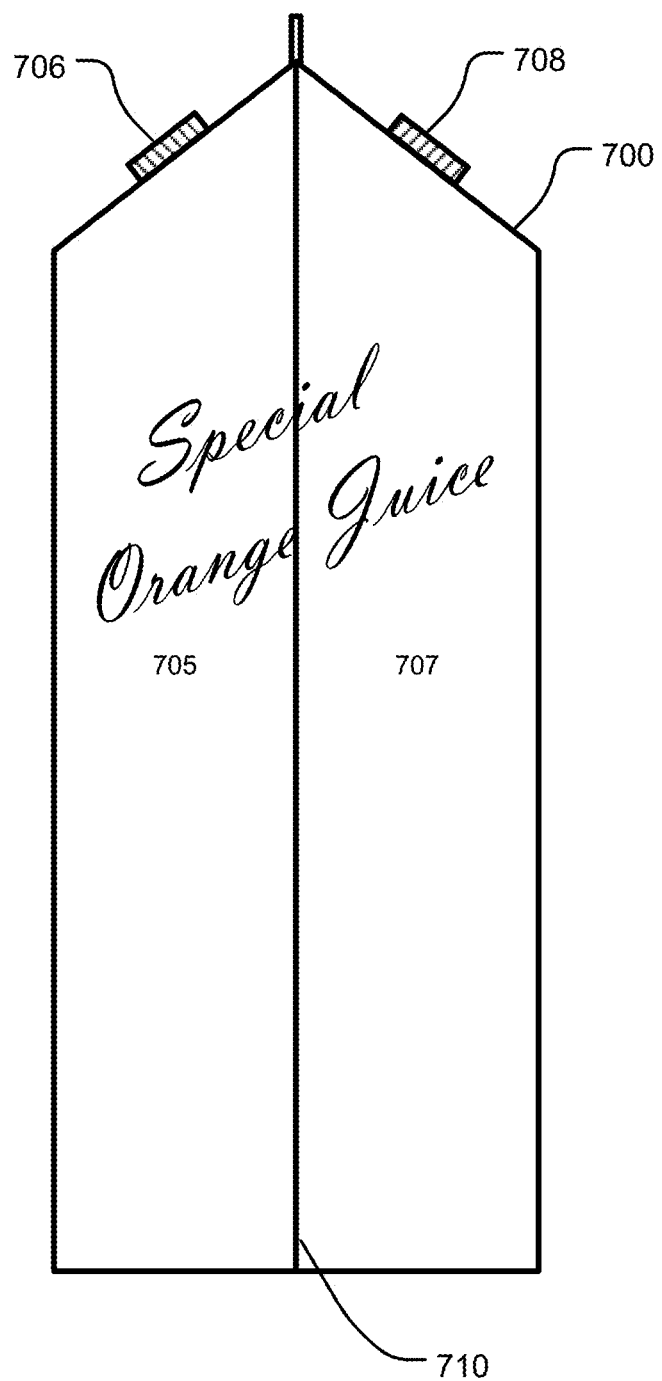
FIG. 7 shows a multi-compartment carton according to one embodiment of the present invention.

FIG. 7 show another embodiment of a multi-compartment container. In this embodiment, multi-compartment container can include a composite container for beverages or other liquids, such as dairy products like milk, cream, half and half, and buttermilk, as well as fruit and vegetable juices, soy milk, almond milks, peanut milk and other specialty beverages. Such multi-compartment containers can include at least two compartments 705 and 707 separated by divider 710 that can have screw top caps like lids 706 and 708 respectively. Multi-compartment container 700 can include an integrated construction, or can include two separated formed containers that are joined together along divider 710. Multi-compartment container 700 can include any of the aforementioned materials suitable for containing liquids.

Figure 8:
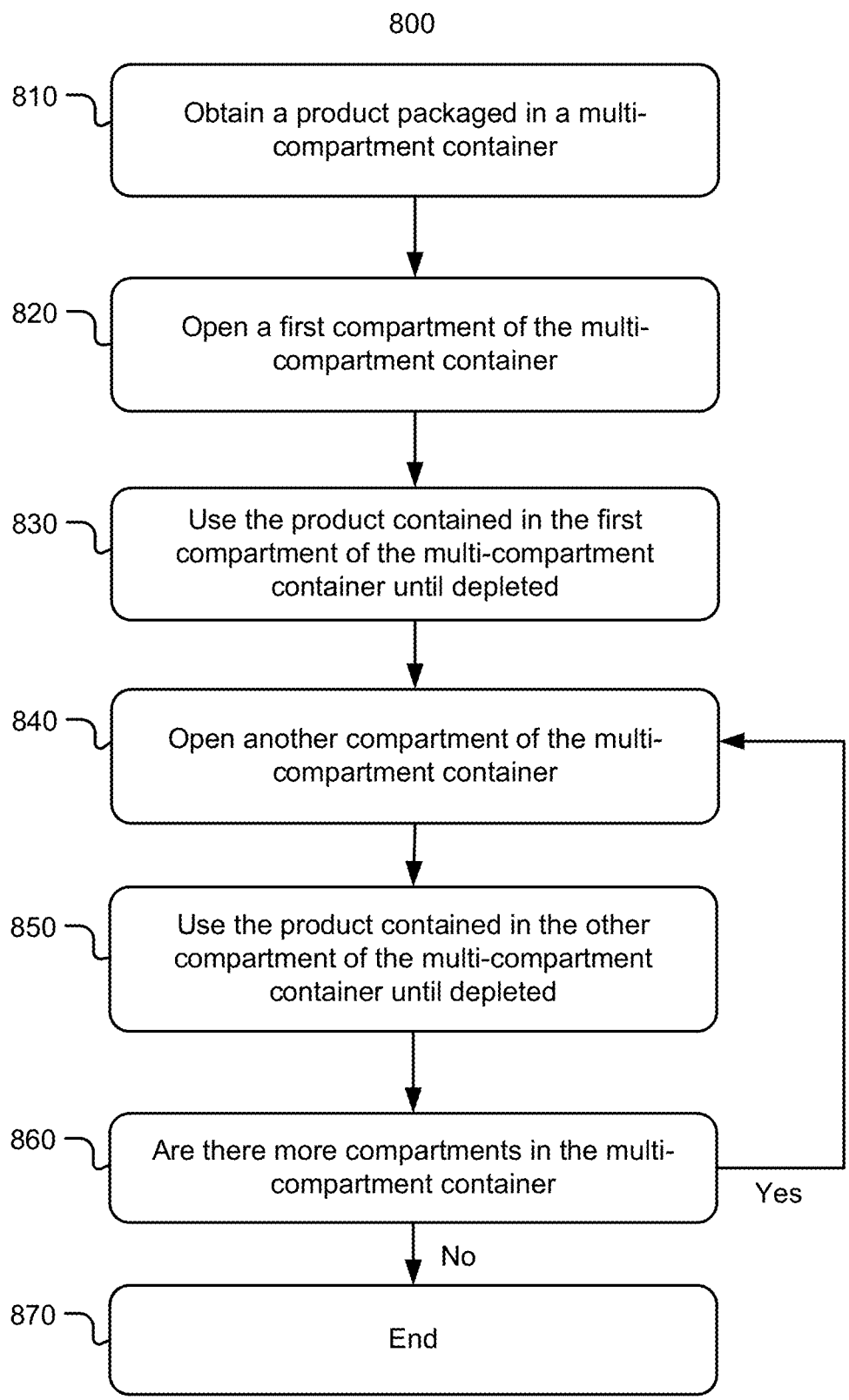
FIG. 8 shows a flowchart of a method for using a multi-compartment container according to one embodiment of the present invention.

FIG. 8 is a flowchart of a method 800 for using a multi-compartment container according to various embodiments of the present invention. At step 810, the consumer can obtain a product packaged in a multi-compartment container. In some embodiments, obtaining a packaged product having a multi-compartment container includes buying a product at a store or ordering a product online, while in other embodiments, the user can reuse a multi-compartment container refilled with the contents of his or her choice. A multi-compartment container can be used for home canning purposes.

At step 820, a user can open one of the compartments of the multi-compartment container as described in reference to FIGS. 1-5 above. The contents of the first compartment of the multi-compartment container can be used either all at once or incrementally, as the contents of the multi-compartment container are needed. If the contents of the multi-compartment container are being used incrementally, the time required to complete the contents of the first compartment may be such that if the entirety of the contents of the container were exposed to air and moisture, the quality, freshness or potency of the contents might be compromised if it were not sealed in the second compartment.

In step 830, a user can use the product contained in the first compartment of the multi-compartment container until it is depleted. At this point the user can open a second compartment of the multi-compartment container at step 840. The contents of the second compartment of the multi-compartment container can then be used until it is depleted in step 850. Once the product contained in the second compartment of the multi-compartment container is depleted, the user can then use any other available compartments of the multi-compartment container still containing product. This is the case if the multi-compartment container includes more than two separate compartments.

At step 860, if there is yet another compartment of the multi-compartment container that still contains product, the user can repeat steps 840 through 860 until no product remains in any compartments of the multi-compartment container. Once all contents of the multi-compartment container are depleted, the user can discard, reuse or recycle the multi-compartment container in step 870.

The above description is illustrative and is not restrictive. Many variations of the invention will become apparent to those skilled in the art upon review of the disclosure.

One or more features from any embodiment may be combined with one or more features of any other embodiment without departing from the scope of the invention. For example, any of the above-described multi-compartment containers can be combined with any other suitable embodiment or type of multi-compartment container in any suitable manner in methods or systems according to embodiments of the invention. As an illustration, a multi-compartment container can have a first box type compartment and second bag type compartment. Alternatively, one compartment can have plastic or composite walls to contain wet products while the attached second compartment can have cardboard walls to contain dry products.

A recitation of "a", "an" or "the" is intended to mean "one or more" unless specifically indicated to the contrary.

What is claimed is:

1. A multi-compartment storage device, comprising:
   a container comprising:
      a first end;
      a second end; and
      at least one surface extending from the first end to the second end;
   a divider wall defining a first compartment extending from the divider wall to the first end and a second compartment extending from the divider wall to the second end;
   a first seal coupled to the first compartment;
   a second seal coupled to the second compartment,
   wherein at least one of the first seal or the second seal is a reusable closure element,
   wherein the container includes first pleats between the first end and the divider wall,
   wherein the container includes second pleats between the second end and the divider wall, and
   wherein the divider wall includes third pleats, and wherein the first pleats, the second pleats, and the third pleats are similar.

2. The multi-compartment storage device of claim 1, wherein the first end of the container is characterized by a first surface area, and wherein the second end of the container is characterized by a second surface area.

3. The multi-compartment storage device of claim 2, wherein the first surface area and the second surface area are substantially the same surface area.

4. The multi-compartment storage device of claim 2, wherein the first surface area is different than the second surface area.

5. The multi-compartment storage device of claim 1, wherein the container comprises a first container comprising a first surface and a second container comprising a second surface, wherein the first surface and the second surface are coupled to one another, and wherein the divider wall is formed by the first surface and the second surface.

6. The multi-compartment storage device of claim 1, wherein the divider wall is affixed to an interior surface of the container.

7. The multi-compartment storage device of claim 1, wherein the divider wall is oriented parallel to the first end and the second end in a horizontal configuration.

8. The multi-compartment storage device of claim 1, wherein the container and the divider wall are a unitary body.

9. The multi-compartment storage device of claim 8, wherein the container and the divider wall comprise a polymer.

10. A method of using a multi-compartment storage device comprising:
    obtaining the multi-compartment storage device, wherein the multi-compartment storage device comprises:
       a container comprising:
          a first end;
          a second end; and
          at least one surface extending from the first end to the second end;
       a divider wall defining a first compartment extending from the divider wall to the first end and a second compartment extending from the divider wall to the second end;
       a first seal coupled to the first compartment; and
       a second seal coupled to the second compartment,
       wherein at least one of the first seal or the second seal is a reusable closure element,
       wherein the container includes first pleats between the first end and the divider wall,
       wherein the container includes second pleats between the second end and the divider wall, and
       wherein the divider wall includes third pleats, and wherein the first pleats, the second pleats, and the third pleats are similar;
    opening the first seal;
    accessing and using product stored in the first compartment until depleted;
    opening the second seal after the product stored in the first compartment is depleted; and
    accessing and using product stored in the second compartment.

11. The method of claim 10, wherein the first end of the container is characterized by a first surface area, wherein the second end of the container is characterized by a second surface area, and wherein the first surface area and the second surface area are substantially the same surface area.

12. The method of claim 10, wherein the container comprises a first container comprising a first surface and a second container comprising a second surface, wherein the first surface and the second surface are coupled to one another, and wherein the divider wall is formed by the first surface and the second surface.

13. The method of claim 10, wherein the divider wall is affixed to an interior surface of the container.

14. The method of claim 10, wherein the container and the divider wall are a unitary body.

15. The method of claim 14, wherein the container and the divider wall comprise a polymer.

16. The multi-compartment storage device of claim 1, wherein at least one of the first seal or the second seal is a zip type seal.

* * * * *